United States Patent [19]

Adams

[11] 4,065,094

[45] Dec. 27, 1977

[54] HYDRAULIC ACTUATOR

[75] Inventor: Ted Adams, Cleveland Heights, Ohio

[73] Assignee: Parker-Hannifin Corporation, Cleveland, Ohio

[21] Appl. No.: 715,983

[22] Filed: Aug. 19, 1976

[51] Int. Cl.[2] ........................ F16K 31/12; F15B 18/00; F15B 20/00

[52] U.S. Cl. ........................................ 251/26; 60/404; 60/405; 60/416

[58] Field of Search ................. 60/404, 405, 413, 416, 60/403, DIG. 10; 251/26

[56] References Cited

U.S. PATENT DOCUMENTS

| | | | |
|---|---|---|---|
| 2,396,984 | 3/1946 | Broadston et al. | 60/404 |
| 2,942,581 | 6/1960 | Gaffney | 60/DIG. 10 |
| 2,974,677 | 3/1961 | Natho | 251/26 X |

*Primary Examiner*—Edgar W. Geoghegan

*Attorney, Agent, or Firm*—Donnelly, Maky, Renner & Otto

[57] ABSTRACT

A hydraulic actuator for a gate or like valve such as the main steam isolation valve in an electric power plant characterized in that the actuator is a compact self-contained unit secured to the valve housing and comprises a hydraulic cylinder having its piston rod connected to the movable valve member to open or close the valve, an air-driven hydraulic pump for pressurizing dual hydraulic circuits (active and standby) each of which includes an accumulator, an air-piloted accumulator control valve, an air-piloted directional control valve for the hydraulic cylinder, and solenoid-operated pilot valves for said control valves in a pneumatic circuit including an air pressure reservoir. The hydraulic actuator is further characterized in that fast closing or opening of the valve is achieved by combined accumulator and pump discharge through the directional control valve and slow opening of the valve is achieved by pump discharge alone. A further characterizing feature of the hydraulic actuator herein is that in the event of electrical power failure, the actuator automatically rapidly closes the valve by the conjoint discharge of the active and standby circuit accumulators and pump discharge. If there is a loss of air pressure to the hydraulic pump and to the active and standby pilot circuits, the respective air reservoirs in the pilot circuits enable closing or opening of the valve by the active or standby accumulator discharge (when electrical power is available for operating the solenoid pilot valves) and automatic rapid closing of the valve by both accumulator discharges (when both air pressure and electric power are lost).

33 Claims, 2 Drawing Figures

HYDRAULIC ACTUATOR

BACKGROUND OF THE INVENTION

Numerous hydraulic actuators are known which embody air-piloted directional control valves with accumulators used as auxiliary pressure sources to supplement hydraulic pump discharge. However, known hydraulic actuators of this character are not suited for actuating, for example, the main steam isolation valve or a feed water valve or a coolant valve in an electric power generator plant which requires a continuous duty actuator. Such valves are generally large size gate valves which require a hydraulic actuator cylinder having an active stroke, of say 24', and, moreover, the hydraulic actuator must be able to close the open valve within a short period of time e.g. 5 seconds or less especially in the event of an accident condition such as a steam line break. A further requirement of such valve actuator is that it be fail-safe with the valve being quickly closed in the event of air and/or electrical power failure. Still another requirement of such actuator, is that it be provided with dual (active and standby) hydraulic and pilot air circuits to enable operation of the actuator to open or close the valve by using either circuit when the other circuit is inoperative or requires servicing.

Still further a valve of the character indicated is intermittently operated relatively infrequently and hence provision must be made for periodic checking of the pre-charge of the active and standby circuit accumulators.

SUMMARY OF THE INVENTION

This invention discloses a hydraulic actuator for a main steam isolation valve or the like as employed in an electric power generator plant which meets the above rigid specifications and which additionally is a compact self-contained unit of manifolded construction to preclude piping rupture or fluid leakage even under seismic conditions. The actuator herein is of the continuous duty type in which the actuator holds the valve in either open or closed position by continuous supply of oil by a small air-driven piston pump, the actuator including an accumulator to supply a large volume of oil to the actuating cylinder when the actuator is operated to close the valve whereby quick closing is effected. The actuator herein also embodies a fail-safe feature whereby in the event of loss of electrical power, the valve is quickly closed, even faster than the usual quick closing, by the supply of fluid to the hydraulic actuating cylinder from both the active and standby circuit accumulators.

Other objects and advantages will appear from the ensuing description.

DETAILED DESCRIPTION OF A PREFERRED EMBODIMENT

Figure 2:
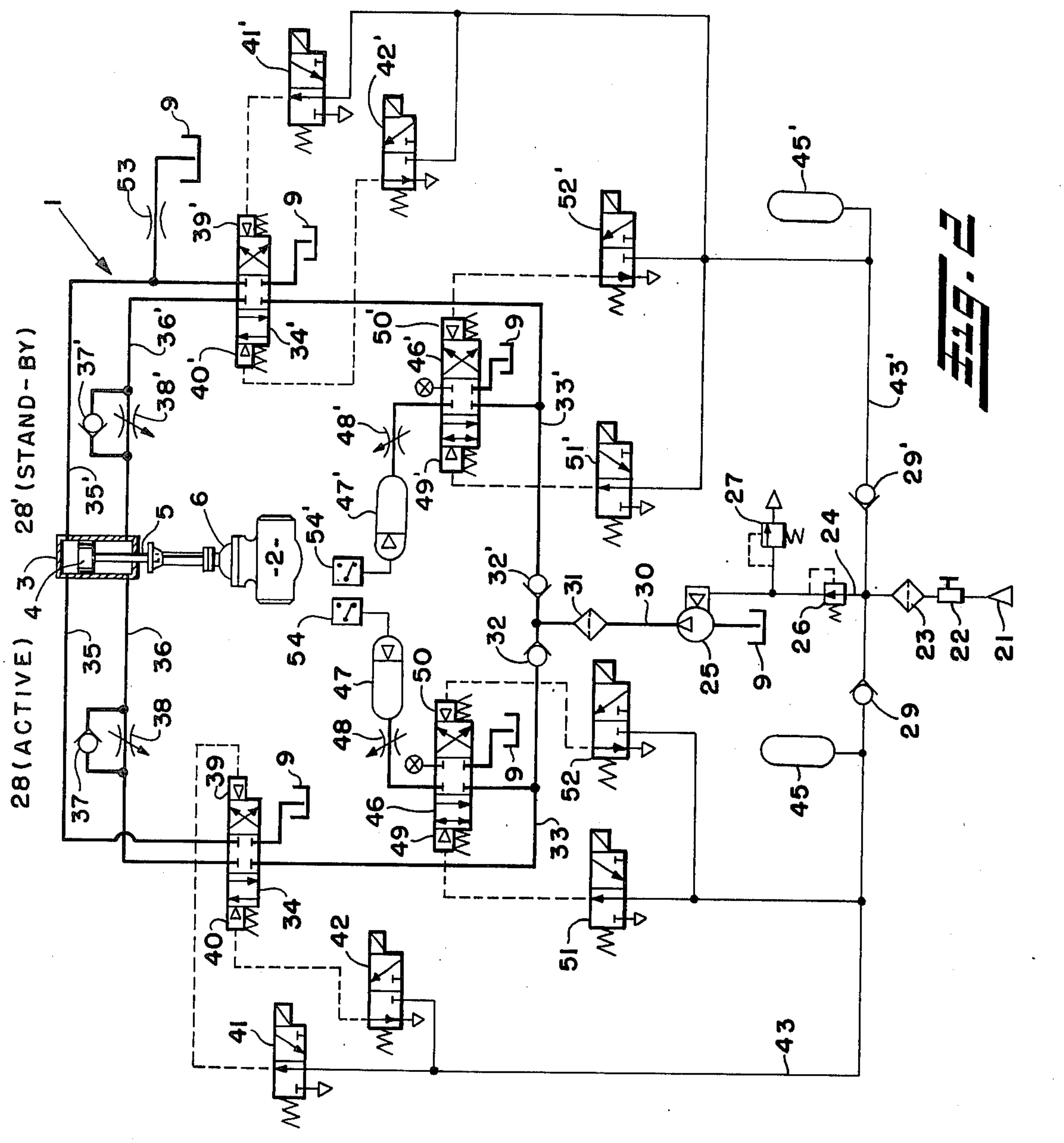
FIG. 2 is a schematic piping diagram of the hydraulic valve actuator shown in FIG. 1.
Figure 1:
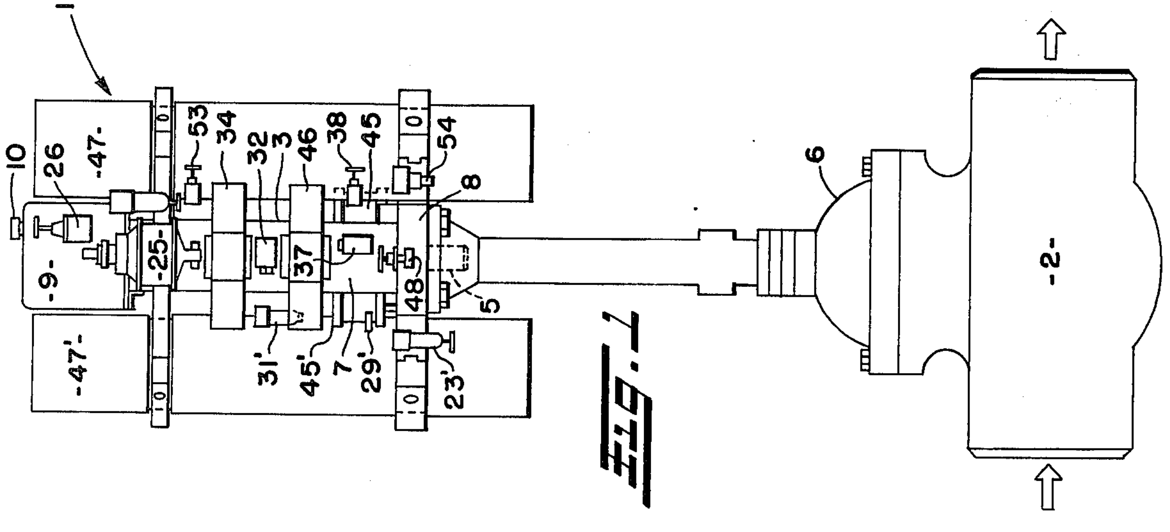
FIG. 1 is a side elevation view of a hydraulic valve actuator mounted on the housing of a main steam isolation gate valve or the like with the piston rod of the actuator being connected to the stem of the reciprocable gate valve member.

The hydraulic valve actuator herein is a compact and self-contained unit or housing assembly 1 which is bolted or otherwise secured to the upper end of a main steam isolation or like valve 2, said unit 1 including a hydraulic cylinder 3 having a piston 4 reciprocable therein with the piston rod 5 secured to the stem of the vertically movable valve member e.g. the gate of the gate valve 2. When the gate is lifted into the pocket 6 in the valve 2, the valve 2 is open and when the gate is moved downwardly to engage its seat the valve 2 is closed.

The unit 1 is of manifolded construction including active and standby manifolds 7 and 7' (not shown) staddling the hydraulic cylinder 3 and having drilled passages for electric wires and for air and oil flow with various valves, accumulators, etc. mounted thereon and on the base plate 8 as shown thus to provide a compact and self-contained unit 1 which effectively resists pipe rupture and fluid leakage even under seismic conditions.

In the case of a nuclear generator plant, the oil reservoir 9 is preferably pressurized as with 2 psi nitrogen pressure to eliminate the effect of oxygen and moisture on the oil (preferably a phosphate ester oil) as well as on the metals employed in the valve actuator. In such application, the reservoir 9 and all fittings and lines may be made of stainless steel and a sealed cap 10 may be provided on the reservoir 9 to prevent breathing in of air or moisture.

Referring now in detail to FIG. 2, the hydraulic actuator unit or housing 1 has an air pressure inlet port 21 with an on/off valve 22 and a filter 23 and the air pressure line 24 leads to an air-driven hydraulic pump 25 preferably a piston pump, the air pressure to the pump 25 being regulated by the regulating valve 26 and the maximum pressure being determined by the relief valve 27. Air pressure is conducted to the active and standby pilot air circuits 28 and 28' via check valves 29 and 29'. The active and standby hydraulic and pilot air circuits 28 and 28' are the same and hence the reference numerals used for the components of the active circuit 28 are used with prime (') designations in the standby circuit 28'.

The hydraulic pressure line 30 from the pump 25 has a filter 31 therein and oil under pressure is delivered to the active and standby circuits 28 and 28' via the check valves 32 and 32' and the pressure line 33 in the active circuit 28 is connected to the inlet port of an air-piloted four-way directional control valve 34 which has motor ports connected by lines 35 and 36 to the head-rod ends of the actuator cylinder 3. Line 36 has therein a check valve 37 and an adjustable needle valve 38 in parallel for free flow of fluid from the rod end of the cylinder 3 and for regulated flow of fluid into the rod end of the cylinder 3. The directional control valve 34 is shown as being of the three-position four-way type having first and second pilot air chambers 39 and 40 which are pressurized or vented by the respective first and second solenoid-operated pilot valves 41 and 42 to which air under pressure is supplied from the air line 43 which has therein a check valve 29 and an air pressure reservoir 45 to insure operation of the directional control valve 34 in the event of loss of air pressure upstream of the check valve 29.

Connected to the oil pressure line 33 via an air-piloted accumulator control valve 46 is an accumulator 47 pressurized as with nitrogen with a needle valve 48 or like flow regulating valve between the accumulator discharge port and the control valve 46. The accumulator control valve 46 may be of the same construction as the directional control valve 34 with first and second pilot air chambers 49 and 50 which are vented or pressurized by first and second solenoid-operated pilot valves 51 and 52 to which pilot air pressure is fed by the line 43.

When the solenoid-operated first and second pilot valves 41 and 42 are deenergized, the first pilot air chamber 39 is pressurized and the second pilot air chamber 40 is vented whereby the directional control valve 34 is shifted to the left to conduct pressure delivered by the pump 25 to the head end of the cylinder 3 to maintain the valve 2 in closed position and the line 35' has a restrictor 53 therein for continuous flow of fluid under pressure to the reservoir 9. Likewise, when the accumulator pilot valves 51 and 52 are deenergized, the accumulator control valve 46 has its first pilot air chamber 49 pressurized and its second pilot air chamber 50 vented so that the control valve 46 is shifted to the right to communicate the accumulator 47 with the pressure line 33 whereby the pressure maintained in the circuit 28 will charge the accumulator 47. Assuming that the valve 2 is closed as just described and that it is desired to open the valve 2 in the fast mode, the first and second pilot valves 41 and 42 will be energized to vent the first air chamber 39 and to pressurize the second air chamber 40 whereby the directional circuit valve 34 will shift to the right to connect the pressure line 33 with the line 36 leading to the rod end of the hydraulic cylinder 3 whereby the valve 2 will be opened at a rate governed by the setting of the flow control valve 38. When the pilot valves 41 and 42 are energized as aforesaid, the first pilot valve 41' of the standby circuit 28' will be energized so that both air chambers 39' and 40' of the standby directional control valve 34' will be vented for shifting of the standby directional control valve 34' to center position blocking flow of fluid from the standby pressure line 33' to both lines 35' 36'. With the directional control valve 34 thus actuated, the piston 4 will be moved upwardly at a rapid rate by pump 25 discharge and by accumulator 47 discharge.

To open the valve 2 in the slow mode, the first pilot valve 51 will be energized so that both chambers 49 and 50 of the accumulator control valve 46 are vented for movement to center position blocking the accumulator 47 from the pressure line 33 whereby the piston 4 will be actuated upwardly by this discharge of the pump 25 alone.

Assuming that the valve 2 is open as just described, the pilot valve 41' will be energized to allow centering of the standby directional control valve 34' and the first pilot valve 41 will be deenergized while also the second pilot valve 42 is deenergized whereby the first air chamber 39 is pressurized and the second air chamber 40 is vented to cause the directional control valve 34 to move to the left position whereat oil pressure is conducted from line 33 to line 35 to the head end of the cylinder 3 to move the piston 4 downwardly, and the displacement of fluid from the rod end passes through line 36 and check valve 37 and regulating valve 38 to the reservoir 9. Of course, with the pilot valves 51 and 52 deenergized the valve 2 will be rapidly closed at a rate governed by the setting of the regulating valve 48.

To exercise the valve 2 from open to close to open with the valve 2 assumed to be open, the pilot valve 51 will be energized allowing the valve 46 to center to thereby isolate the accumulator 47. The pilot valve 41' will be energized to allow the valve 34' to center and the pilot valves 41 and 42 will be deenergized to cause the valve 34 to connect the pressure line 33 with the line 35 leading to the head end of the cylinder 3 whereby the valve 2 will close at a rate governed by the pump 25 displacement. When the valve 2 has traveled the required exercise distance, an exercise limit switch (not shown) will cause pilot valves 41 and 42 to be energized to cause the directional control valve 34 to connect the pressure line 33 with the line 36 leading to the rod end of the cylinder 3 whereby the valve 2 will be opened at a rate governed by the pump 25 displacement. When the valve 2 reaches the full open position, an appropriate switch (not shown) will deenergize the pilot valve 42 to center the directional control valve 34.

When the valve 2 is either fully opened or fully closed, the pilot valves 41 and 41' may be energized to allow both directional control valves 34 and 34' to be centered so that the valve 2 will remain in either fully open or fully closed position. When the pilot valves 51 and 52 are energized the valve 46 is shifted to connect the pressure line 33 to a plugged port and the accumulator 47 is communicated with the reservoir 9 which will discharge the accumulator 47 to the reservoir whereby a nitrogen pressure check may be taken at this time by the pressure switch 54. To charge the accumulator 47 with hydraulic fluid, the pilot valves 51 and 52 will be deenergized to cause the control valve 46 to be shifted to connect the pressure line 33 with the accumulator 47 and, therefore, the pump 25 will deliver hydraulic fluid under pressure into the accumulator 47. The precharge check of the standby accumulator 47' is accomplished in the same way except that the pilot valves 51' and 52' are energized and deenergized to shift the control valve 46' in the same manner as just described in connection with the active control valve 46.

If, when the valve 2 is open, there is an electrical power failure with all pilot valves being deenergized, the directional control valves 34 and 34' will be shifted to connect the pressure lines 33 and 33' with the lines 35 and 35' leading to the head end of the cylinder 3. Therefore, the valve 2 will be closed at a rate governed by the setting of the valves 48 and 48' which will be approximately twice the normal fast closing rate.

It is to be understood that the foregoing description of the use of the active circuit 28 for opening and closing the valve 2 is equally applicable to the standby circuit 28' to achieve fast closing and opening of the valve 2 and slow opening of the valve 2.

The embodiments of the invention in which an exclusive property or privilege is claimed are defined as follows:

1. A self-contained hydraulic actuator comprising a housing adapted to be secured to a valve housing for opening and closing said valve by hydraulically actuating a movable valve member is said valve housing; said actuator housing comprising a hydraulic motor having a hydraulically-actuated component adapted to be secured to said valve member, a reservoir, an air-driven hydraulic pump, and an air-piloted directional control valve operatively interconnected together for fluid pressure actuation of said component selectively in opposite directions in response to operation of said directional control valve; and first and second solenoid-operated pilot valves operative when energized and deenergized to vent and pressurize a first pilot air chamber in said directional control valve and to pressurize and vent a second pilot air chamber in said directional control valve to actuate said component to respectively open and close said valve; said actuator housing having an air pressure inlet port communicating with said pump and said first and second pilot valves.

2. The actuator of claim 1 wherein said actuator housing has a hydraulic accumulator communicated with a fluid pressure line between said pump and said directional control valve operative to effect rapid actuation of said component when said pilot valves are energized or deenergized.

3. The actuator of claim 2 wherein an air-piloted accumulator control valve selectively blocks and opens communication between said accumulator and said fluid pressure line or communicates said accumulator with said reservoir; and first and second solenoid-operated accumulator pilot valves operative when energized and deenergized to vent and pressurize a first pilot air chamber in said accumulator control valve and to pressurize and vent a second pilot air chamber in said accumulator control valve respectively to communicate said accumulator with said reservoir and with said fluid pressure line; said accumulator control valve blocking communication between said accumulator and said fluid pressure line when both of said first and second pilot air chambers are vented or pressurized.

4. The actuator of claim 1 wherein said component is retained in valve opening position by continuous energization of said first and second pilot valves and is actuated in valve closing direction upon deenergization of said first and second pilot valves.

5. The actuator of claim 1 wherein a pilot air passage in said actuator housing between said inlet port and said pilot valves has a check valve therein and an air-pressure reservoir downstream of said check valve to supply pilot air pressure for operating said directional control valve in the event of loss of air pressure upstream of said check valve.

6. The actuator of claim 1 wherein said directional control valve blocks communication of said fluid pressure line with said hydraulic motor when both of said first and second pilot air chambers are vented or pressurized.

7. The actuator of claim 1 wherein said component is retained in valve closing position by hydraulic pressure via said directional control valve when said first and second pilot valves are deenergized, the output of said pump being conducted to said reservoir via a restrictor downstream of said directional control valve.

8. The actuator of claim 2 wherein said directional control valve, said accumulator, and said first and second pilot valves constitute an active circuit and wherein said actuator housing has a standby circuit including a standby directional control valve, a standby accumulator, and standby first and second pilot valves communicated with said pump and with said air inlet port of actuation of said component in response to operation of said standby directional control valve by energization and deenergization of said standby first and second pilot valves.

9. The actuator of claim 8 wherein, said active and standby first and second pilot valves are deenergized, said active and standby directional control valves are operated to effect movement of said component in valve closing direction at a rapid rate by the conjoint discharge of said pump and said active and standby accumulators.

10. The actuator of claim 8 wherein, when said active or standby circuit is in use for actuating said component, said standby or active first pilot valve is energized to close said standby or active directional control valve.

11. The actuator of claim 10 wherein active and standby check valves upstream of the respective accumulators and directional control valves conduct fluid under pressure from said pump to the active or standby circuit then in use.

12. A self-contained hydraulic actuator unit adapted to be secured to a valve housing to actuate a valve member therein to valve opening and closing positions; said unit comprising a hydraulic motor having a hydraulically-actuated component adaptedto be operatively connected to said valve member, a reservoir, a hydraulic pump, and an air-piloted directional control valve operatively interconnected together for fluid pressure actuation of said component selectively in opposite directions in response to operation of said directional control valve; and first and second solenoid-operated pilot valves operative when energized and deenergized to vent and pressurize a first pilot air chamber in said directional control valve and to pressurize and vent a second pilot air chamber in said directional control valve to actuate said component to respectively open and close said valve; said actuator housing having an air pressure inlet port communicating with said first and second pilot valves.

13. The actuator of claim 12 wherein said unit has a hydraulic accumulator communicated with a fluid pressure line between said pump and said directional control valve operative to effect rapid actuation of said component when said pilot valves are energized or deenergized.

14. The actuator of claim 13 wherein an air-piloted accumulator control valve selectively blocks and opens communication between said accumulator and said fluid pressure line or communicates said accumulator with said reservoir; and first and second solenoid-operated accumulator pilot valves operative when energized and deenergized to vent and pressurize a first pilot air chamber in said accumulator control valve and to pressurize and vent a second pilot air chamber in said accumulator control valve respectively to communicate said accumulator with said reservoir and with said fluid pressure line; said accumulator control valve blocking communication between said accumulator and said fluid pressure line when both of said first and second pilot air chambers are vented or pressurized.

15. The actuator of claim 12 wherein said component is retained in valve opening position by continuous energization of said first and second pilot valves and is actuated in valve closing direction upon deenergization of said first and second pilot valves.

16. The actuator of claim 12 wherein a pilot air passage in said unit between said inlet port and said pilot valves has a check valve therein and an air-pressure reservoir downstream of said check valve to supply pilot air pressure for operating said directional control valve in the event of loss of air pressure upstream of said check valve.

17. The actuator of claim 12 wherein said directional control valve blocks communication of said fluid pressure line with said hydraulic motor when both of said first and second pilot air chambers are vented or pressurized.

18. The actuator of claim 12 wherein said component is retained in valve closing position by hydraulic pressure via said directional control valve when said first and second pilot valves are deenergized, the output of said pump being conducted to said reservoir via a restrictor downstream of said directional control valve.

19. The actuator of claim 13 wherein said directional control valve, said accumulator, and said first and second pilot valves constitute an active circuit and wherein said unit has a standby circuit including a standby directional control valve, a standby accumulator, and standby first and second pilot valves communicated with said pump and with said air inlet port for actuation of said component in response to operation of said standby directional control valve by energization and deenergization of said standby first and second pilot valves.

20. The actuator of claim 19 wherein, when said active and standby first and second pilot valves are deenergized, said active and standby directional control valves are operated to effect movement of said component in valve closing direction at a rapid rate by the conjoint discharge of said pump and said active and standby accumulators.

21. The actuator of claim 19 wherein, when said active or standby circuit is in use for actuating said component, said standby or active first pilot valve is energized to close said standby or active directional control valve.

22. The actuator of claim 21 wherein active and standby check valves upstream of the respective accumulators and directional control valves conduct fluid under pressure from said pump to the active or standby circuit then in use.

23. A self-contained hydraulic actuator unit comprising a base plate adapted to be secured to a valve housing; a hydraulic cylinder on said base plate having its piston rod adapted for connection with a movable valve member in said valve housing for opening and closing said valve; a pair of manifold blocks on said base plate straddling said hydraulic cylinder; said unit, remote from said base plate, having thereon a reservoir, and a hydraulic pump; an air-piloted directional control valve on each manifold block operatively interconnected with said pump, reservoir, and cylinder for fluid pressure actuation of said piston selectively in opposite directions in response to operation of said directional control valve; and first and second solenoid-operated pilot valves on each manifold block operative when energized and deenergized to vent and pressurize a first pilot air chamber in the associated directional control valve and to pressurize and vent a second pilot air chamber in the associated directional control valve to actuate said piston to respectively open and close said valve; said unit having an air pressure inlet port communicating with said first and second pilot valves.

24. The actuator of claim 23 wherein said unit has a pair of hydraulic accumulators parallel to and straddling said cylinder and communicated with a fluid pressure line between said pump and the respective directional control valves operative to effect rapid actuation of said piston when said pilot valves of either directional control valve are energized or deenergized.

25. The actuator of claim 24 wherein an air-piloted accumulator control valve on each manifold block selectively blocks and opens communication between the associated accumulator and said fluid pressure line or cummunicates the associated accumulator with said reservoir; and first and second solenoid-operated accumulator pilot valves associated with each accumulator control valve and operative when energized and deenergized to vent and pressurize a first pilot air chamber in the associated accumulator control valve and to pressurize and vent a second pilot air chamber in the associated accumulator control valve respectively to communicate said accumulator with said reservoir and with said fluid pressure line; each accumulator control valve blocking communication between the associated accumulator and said fluid pressure line when both of said first and second pilot air chambers are vented or pressurized.

26. The actuator of claim 23 wherein said piston is retained in valve opening position by continuous energization of said first and second pilot valves of the associated directional control and is actuated in valve closing direction upon deenergization of said first and second pilot valves.

27. The actuator of claim 23 wherein pilot air passages in said unit between said inlet port and the respective first and second pilot valves have check valves therein and air-pressure reservoirs downstream of said check valves to supply pilot air pressure for operating either of said directional control valves in the event of loss of air pressure upstream of said check valves.

28. The actuator of claim 23 wherein each directional control valve blocks communication of said fluid pressure line with said hydraulic motor when both of said first and second pilot air chambers are vented or pressurized.

29. The actuator of claim 23 wherein said piston is retained in valve closing position by hydraulic pressure via said directional control valves when the associated first and second pilot valves are deenergized, the output of said pump being conducted to said reservoir via a restrictor downstream of said directional control valves.

30. The actuator of claim 24 wherein one of said directional control valves, accumulators, and first and second pilot valves constitute and active circuit and wherein the other of said directional control valves, accumulators, and first and second pilot valves constitute a standby circuit.

31. The actuator of claim 30 wherein, when said active and standby first and second pilot valves are deenergized, said active and standby directional control valves are operated to effect movement of said piston in valve closing direction at a rapid rate by the conjoint discharge of said pump and said active and standby accumulators.

32. The actuator of claim 30 wherein, when said active or standby circuit is in use for actuating said piston, said standby or active first pilot valve is energized to close said standby or active directional control valve.

33. The actuator of claim 32 wherein active and standby check valves upstream of the respective accumulators and directional control valves conduct fluid under pressure from said pump to the active or standby circuit then in use.

* * * * *